US011523259B2

(12) United States Patent
Flasher et al.

(10) Patent No.: US 11,523,259 B2
(45) Date of Patent: *Dec. 6, 2022

(54) METHODS AND SYSTEMS FOR VEHICLE BASED INTERNET OF THINGS

(71) Applicant: HONEYWELL INTERNATIONAL INC., Morris Plains, NJ (US)

(72) Inventors: Robert E Flasher, Phoenix, AZ (US); Nayyar Azam Khan Rao, Karnataka (IN); Robert Pickell, Atlanta, GA (US); Charles Dairman, Buckeye, AZ (US); Justin Schassler, Glendale, AZ (US); Paramjit Kaur, Peoria, AZ (US); Carol Rogers, Phoenix, AZ (US); Anup Raje, Karnataka (IN)

(73) Assignee: Honeywell International Inc., Charlotte, NC (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/077,609

(22) Filed: Oct. 22, 2020

(65) Prior Publication Data
US 2021/0058753 A1 Feb. 25, 2021

Related U.S. Application Data

(63) Continuation of application No. 16/118,778, filed on Aug. 31, 2018, now Pat. No. 10,848,940.
(Continued)

(51) Int. Cl.
H04W 4/46 (2018.01)
H04W 4/44 (2018.01)
(Continued)

(52) U.S. Cl.
CPC .............. *H04W 4/46* (2018.02); *G07C 5/008* (2013.01); *H04L 45/306* (2013.01); *H04L 67/12* (2013.01); *H04W 4/44* (2018.02); *H04W 88/16* (2013.01)

(58) Field of Classification Search
CPC ......... H04W 4/46; H04W 4/44; H04W 88/16; G07C 5/008; H04L 45/306; H04L 67/12
See application file for complete search history.

(56) References Cited

U.S. PATENT DOCUMENTS 6,449,541 B1 9/2002 Goldberg et al.
2005/0278307 A1* 12/2005 Battagin ................. G06F 16/25
(Continued)

OTHER PUBLICATIONS

European Search Report dated Jun. 5, 2019 in corresponding European Application No. 19150127.9 (8 pages).

*Primary Examiner* — Will W Lin
(74) *Attorney, Agent, or Firm* — Bookoff McAndrews, PLLC

(57) ABSTRACT

Systems and methods are disclosed for exchanging real-time data between vehicle systems by receiving, at a first source system, a request for data from a requestor and, based on determining that the first source system does not have all requested data, querying an operations center for missing data. Then, based on determining that the operations center does not have all missing data, the operations center is queried for a list comprising candidate source systems. Upon identifying a next source system from the list, the next source system is queried for missing data, and the next source system is removed from the list. Based on whether the next source system has all missing data, either all missing data is transmitted to the requestor, or, the process of finding and querying for the missing data is iteratively performed until all missing data is received or the list is empty.

20 Claims, 4 Drawing Sheets

Related U.S. Application Data

(60) Provisional application No. 62/613,701, filed on Jan. 4, 2018.

(51) Int. Cl.
    *H04L 45/302*     (2022.01)
    *H04W 88/16*     (2009.01)
    *G07C 5/00*     (2006.01)
    *H04L 67/12*     (2022.01)

(56) References Cited

U.S. PATENT DOCUMENTS

| | | | |
|---|---|---|---|
| 2007/0027589 A1* | 2/2007 | Brinkley | G08G 5/0013 701/3 |
| 2007/0028048 A1* | 2/2007 | Kuttanna | G06F 9/383 712/E9.047 |
| 2009/0106393 A1* | 4/2009 | Parr | H04L 67/104 709/218 |
| 2009/0135729 A1* | 5/2009 | Saffre | H04L 45/306 370/252 |
| 2010/0153771 A1* | 6/2010 | Gordon | G06F 11/1456 709/204 |
| 2013/0151065 A1 | 6/2013 | Ricci | |
| 2014/0331260 A1* | 11/2014 | Gratton | H04N 21/482 725/40 |
| 2014/0342267 A1 | 11/2014 | Kim | |
| 2014/0342671 A1* | 11/2014 | Kim | H04W 4/02 455/41.3 |
| 2015/0334113 A1 | 11/2015 | Angus et al. | |
| 2016/0036513 A1 | 2/2016 | Klippert et al. | |
| 2018/0343320 A1* | 11/2018 | Gay | H04L 67/2833 |
| 2019/0182329 A1* | 6/2019 | Moss | G06N 20/20 |

* cited by examiner

METHODS AND SYSTEMS FOR VEHICLE BASED INTERNET OF THINGS

RELATED APPLICATIONS

This application is a continuation and claims the benefit of priority to U.S. application Ser. No. 16/118,778, filed Aug. 31, 2018, which claims the benefit of priority to U.S. Provisional Application No. 62/613,701 filed on Jan. 4, 2018, the entireties of which are incorporated herein by reference.

TECHNICAL FIELD

The present disclosure relates to methods and systems for exchanging real-time data between edge systems. More particularly, the present disclosure relates to methods and systems for facilitating intra-vehicle as well as inter-vehicle data communications between edge systems of vehicles.

BACKGROUND

Vehicles can benefit from receiving real time and historical data from other sources, such as other vehicles. Further, vehicles can benefit from transmitting real time and historical data to target locations, such as ground stations or maintenance depots. Data patterns and trends can be determined from the received data, and the recipient can utilize the data patterns and trends to perform meaningful actions. For example, vehicles may update their travel plans based on data received from other vehicles. As another example, maintenance depots may analyze the received data to identify defective components of the vehicles and plan to perform vehicle maintenance services accordingly.

Conventionally, the collection and analysis of such "Big Data" has been centralized. Various centralized solutions have been proposed to utilize data from vehicles. However, the centralized approaches have proven to be inflexible and cumbersome, often resulting in bottlenecks depending on the amount of data and analysis involved. Therefore, there is a need for a more flexible system for collecting and analyzing real-time data from vehicles, and also for allowing multiple vehicles to share critical data through a more streamlined communication network.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

Further, it would be obvious to one of ordinary skill in the pertinent art that the aforementioned need may exist in many contexts, including but not limited to a aircrafts, motor vehicles (e.g., motorcycles, cars, trucks, buses, etc.), railed vehicles (e.g., trains, trams, subways, etc.), watercraft (e.g., ships, boats, yachts, etc.), spacecraft, and any other vehicles or moving machines. Therefore, the exemplary embodiment of the current disclosure may not be limited to any specific vehicle type, but may also be integrated with machines, systems, components, or any other environment or context in which the aforementioned need may exist.

SUMMARY OF THE INVENTION

One embodiment provides a computer implemented method for exchanging real-time data between vehicle systems, the method comprising: a) receiving, at a first source system, a request for data from a requestor; b) based on determining that the first source system does not have all of the requested data, querying an operations center for missing data; c) based on determining that the operations center does not have all of the missing data, querying the operations center for a list comprising candidate source systems; d) identifying a next source system from the list; e) querying the next source system for all or some of the missing data; f) removing the next source system from the list; and g) based on determining the next source system has all of the missing data, transmitting all of the missing data to the requestor, or based on determining the next source system does not have all of the missing data, iteratively performing steps d)-h) until the list is empty or all of the missing data has been transmitted to the requestor.

One embodiment provides a system for exchanging real-time data between vehicle systems. The system may comprise one or more processors; and a non-transitory computer readable medium storing instructions that, when executed by the one or more processors, cause the one or more processors to perform a method comprising a) receiving, at a first source system, a request for data from a requestor; b) based on determining that the first source system does not have all of the requested data, querying an operations center for missing data; c) based on determining that the operations center does not have all of the missing data, querying the operations center for a list comprising candidate source systems; d) identifying a next source system from the list; e) querying the next source system for all or some of the missing data; f) removing the next source system from the list; and g) based on determining the next source system has all of the missing data, transmitting all of the missing data to the requestor, or based on determining the next source system does not have all of the missing data, iteratively performing steps d)-h) until the list is empty or all of the missing data has been transmitted to the requestor.

One embodiment provides a non-transitory computer readable medium for exchanging real-time data between vehicle systems. The non-transitory computer readable medium may store instructions that, when executed by one or more processors, cause the one or more processors to perform a method comprising a) receiving, at a first source system, a request for data from a requestor; b) based on determining that the first source system does not have all of the requested data, querying an operations center for missing data; c) based on determining that the operations center does not have all of the missing data, querying the operations center for a list comprising candidate source systems; d) identifying a next source system from the list; e) querying the next source system for all or some of the missing data; f) removing the next source system from the list; and g) based on determining the next source system has all of the missing data, transmitting all of the missing data to the requestor, or based on determining the next source system does not have all of the missing data, iteratively performing steps d)-h) until the list is empty or all of the missing data has been transmitted to the requestor.

BRIEF DESCRIPTION OF THE DRAWINGS

Embodiments of the invention will now be described, by way of example only, with reference to the accompanying drawings in which.

DETAILED DESCRIPTION

Figure 1A:
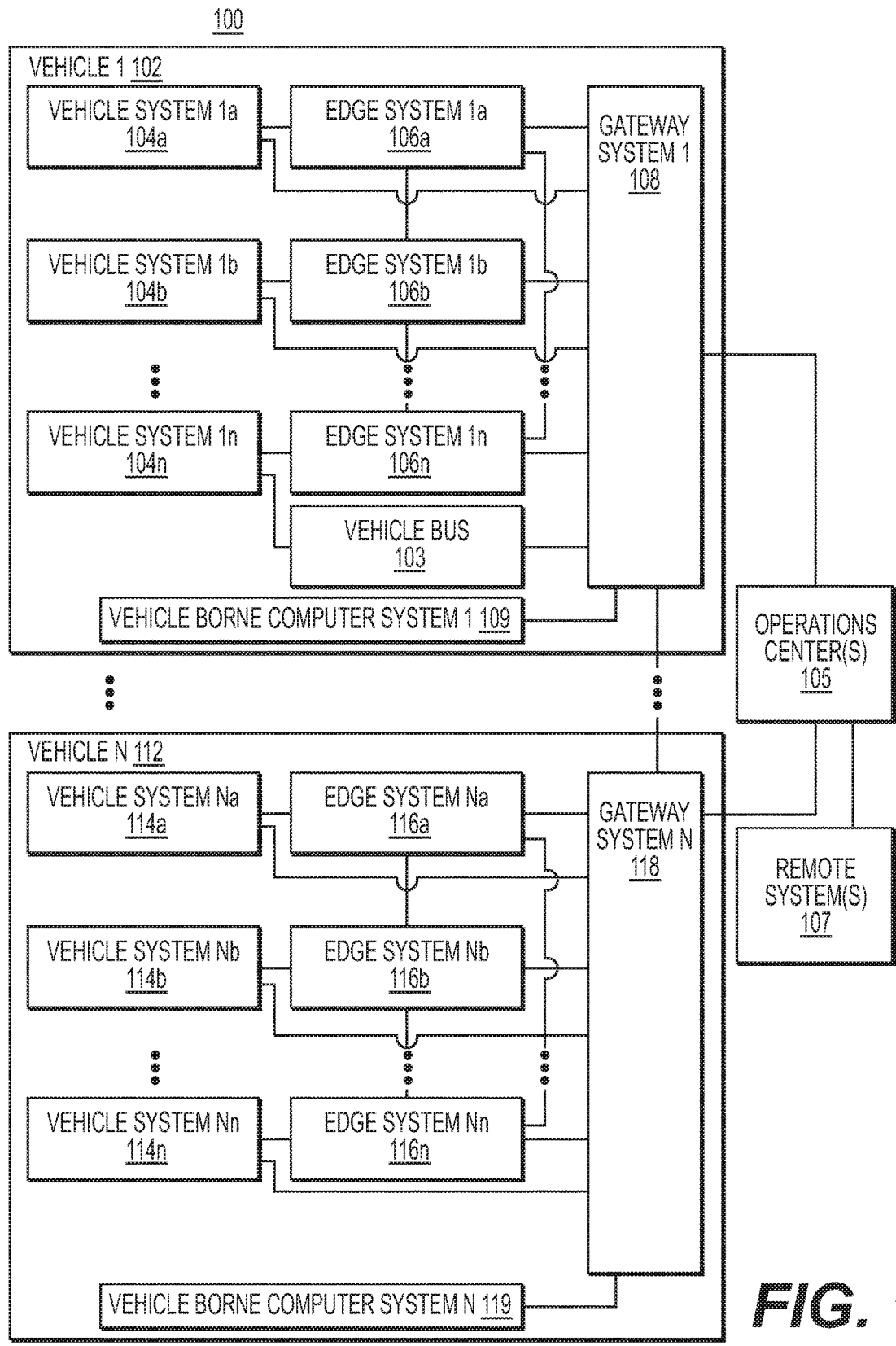
FIG. 1A illustrates a block diagram of an exemplary embodiment of a system of communicatively coupled vehicles, at least one operations center, and at least one remote system.

The following embodiments describe systems and methods for facilitating intra-vehicle as well as inter-vehicle data communications between edge systems of vehicles.

A dynamic and decentralized technique for implementing a system of Internet of Things (IoT) on vehicles is provided. The technique facilitates communications within a vehicle, between vehicles, and between vehicles and data centers. Such communications may be facilitated by edge systems and gateway systems. The edge systems and gateway systems may be located on vehicles (i.e., on-board) as embedded or fixed systems and/or other devices such as tablet PCs and mobile phones. Each edge system may be coupled to a vehicle system from which vehicle data may be collected, and in communication with other edge systems and gateway systems. Each gateway system may be in communication with vehicle systems and edge systems of the vehicle in which the gateway system is resident, and may also be in communication with gateway systems located in other vehicles, all or some of which may provide data to the gateway system. By facilitating communication with gateway systems located in other vehicles, the gateway system may enable exchange of data among edge systems installed in different vehicles. Independent user computing devices such as tablet PCs and mobile phones may be directly coupled to and/or in communication with the edge systems and/or gateway systems, to request, filter, view, and/or analyze data.

Hardware for all or some of the edge systems and gateway systems may already be installed in vehicles. Therefore, only software may need to be installed on the corresponding, pre-existing hardware. The software implemented in the edge systems and gateway systems may comprise computer-executable code for performing various data functions, including but not limited to data request, data query, data retrieval, data transmission, and data analytics. The edge systems and gateway systems each identify source(s) of relevant data, and request that data be provided dynamically (as needed) or statically (all the time) from the identified source(s), such as other edge systems coupled to vehicle systems in the vehicle or other vehicles, gateway systems in the vehicle or other vehicles, decentralized system(s) such as cloud computing center(s), and centralized system(s) such as dedicated server farms. The decentralized system(s) and centralized system(s) may be owned by the operators of the vehicles, or by a third party such as a government or a commercial entity.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). Furthermore, the method presented in the drawings and the specification is not to be construed as limiting the order in which the individual steps may be performed. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" or "in some embodiments" as used herein does not necessarily refer to a different embodiment. It is intended, for example, that claimed subject matter include combinations of exemplary embodiments in whole or in part.

Figure 1B:
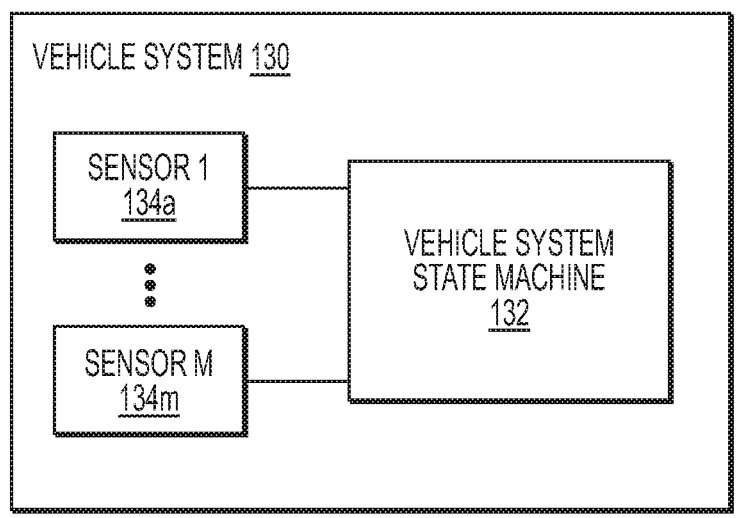
FIG. 1B illustrates a block diagram of an exemplary embodiment of a vehicle system.

FIG. 1A illustrates a block diagram of an exemplary embodiment of a system of communicatively coupled vehicles, at least one operations center, and at least one remote system. In general, FIG. 1A depicts system 100 including multiple vehicles (i.e., vehicle 1 to vehicle N) with various systems implemented thereon, at least one operations center 105, and at least one remote system 107. Each vehicle, such as vehicle 1 102, may include at least one vehicle system (e.g., vehicle system 1a 104a through vehicle system 1n 104n), at least one edge system (e.g., edge system 1a 106a through edge system 1n 106n), at least one vehicle borne computer system (e.g., vehicle borne computer system 1 109), and at least one gateway system (e.g., gateway system 1 108). FIG. 1B illustrates a block diagram of an exemplary embodiment of a vehicle system. In general, FIG. 1B depicts a vehicle state machine 132 and at least one sensor (e.g., sensor 1 134a through sensor M 134m) implemented on vehicle system 130. Vehicle system 130 in FIG. 1B is a detailed view of an exemplary vehicle system illustrated in FIG. 1A (e.g., vehicle system 1a 104a through vehicle system 1n 104n, vehicle system Na 114a through vehicle system Nn 114n). In the discussion below, reference will be made to both FIG. 1A and FIG. 1B.

As alluded to above, each vehicle may include one or more vehicle systems. For instance, vehicle 1 102 may include vehicle system 1a 104a through vehicle system 1n 104n, and vehicle N 112 may include vehicle system Na 114a through vehicle system Nn 114n. Examples of a vehicle system may include, but not limited to, a propulsion system, vehicle control system, environmental system, navigation system, travel (e.g., flight) management system, communication system, and maintenance system. Each vehicle system, as illustrated in FIG. 1B, may comprise a vehicle system state machine 132, and sensor 1 134a through sensor M 134m, each sensor being coupled to the vehicle system state machine 132.

Each edge system in a vehicle may be coupled to a sensor of a corresponding vehicle system in the same vehicle, enabling data captured by the sensor to be provided directly to the edge system. Also, a gateway system in a vehicle may be coupled to one or more sensors of vehicle systems in the same vehicle, enabling data captured by the one or more sensors to be provided directly to the gateway system. In another embodiment, each edge system in a vehicle may be coupled to vehicle system state machine 132 of a corresponding vehicle system in the same vehicle. Also, a gateway system in a vehicle may be coupled to vehicle system state machines 132 of vehicle systems in the same vehicle. As illustrated in FIG. 1B, vehicle system state machine 132 may be configured to collect data from the coupled one or more sensors, perform computations and/or analysis of the collected data, store the collected and/or analyzed data in memory, and provide the collected and/or analyzed data to connected one or more edge systems and/or gateway system. In some embodiments, the vehicle system state machine 132 may not be implemented in the vehicle system 130, or may not be coupled to the one or more sensors of the vehicle system 130. If the vehicle system state machine 132 is not implemented or not coupled to the one or more sensors, data captured by the one or more sensors may be provided directly to the one or more connected edge systems and/or gateway system.

Each vehicle system may be in communication with, through an edge system or not, a gateway system. For instance, vehicle 1 102 may include gateway system 1 108 and vehicle N 112 may include gateway system N 118. Each vehicle system of a vehicle may be in communication with a gateway system of the same vehicle through one or more ways, e.g., through an edge system, a vehicle bus, or otherwise directly through a network. For example, as illustrated in FIG. 1A, vehicle system 1*a* 104*a* and vehicle system 1*b* 104*b* may be communicatively coupled to gateway system 1 108 directly, and/or may be in communication with the gateway system 1 108 through edge system 1*a* 106*a* and edge system 1*b* 106*b* respectively. Vehicle system 1*n* 104*n* may be in communication with gateway system 1 108 through edge system 1*n* 106*n* and/or through vehicle bus 103. In one embodiment, vehicle bus 103 may be an ARINC 429 bus.

As illustrated in FIG. 1A, edge systems in a vehicle may be in direct communication with one another. For example, any data retained by one edge system may be transmitted directly to another edge system within the same vehicle 1 102, without gateway system 1 108 acting as an intermediary. In another embodiment, an edge system may send to or receive data from another edge system located in the same vehicle through a gateway system. The communication between the edge systems and the communication between the edge systems and the gateway system may be through a wired or wireless connection.

Each gateway system in a vehicle may be communicatively coupled to one or more vehicle borne computer systems in the same vehicle. As illustrated in FIG. 1A, gateway system 1 108 may be coupled to vehicle borne computer system 1 109 in vehicle 1 102, and gateway system N 118 may be coupled to vehicle borne computer system N 119 in vehicle N 112. Such vehicle borne computer systems may be part of the vehicle, or independent/separate from the vehicle, such as smart phones, tablet PCs, and/or laptops, which may have been brought onto the vehicle by passengers, vehicle crew, or maintenance personnel. The vehicle borne computer systems may be coupled to the gateway system wirelessly or through a wired connection, and thus also be in communication with the edge systems through the gateway system. Therefore, data stored at the gateway systems may comprise data transmitted from the edge systems. The vehicle borne computer systems may be configured to request and receive data from the gateway system as well as the edge systems, via request/response interfaces enabled by edge software, which will be described in detail in the following sections. The vehicle borne computer systems may also be configured to select and/or change filters of the edge systems, in order to selectively filter incoming data at the edge systems. Furthermore, the vehicle borne computer systems may be equipped with data analytics software to performing data analytics on the received data and may be configured to display the received data and/or the results of the data analysis via a graphical user interface (e.g., display data using a web browser, dedicated application, etc.). The vehicle borne computer systems may also be configured to subscribe to events generated by the edge systems and the operations centers.

A gateway system of a vehicle may be in communication with gateway systems of other vehicles. Through this communication path, an edge system or a gateway system of a vehicle may transmit data to and obtain data from edge systems or gateway systems of other vehicles. The communication path between gateway systems of different vehicles may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed. An edge system in a vehicle may communicate with another edge system in a different vehicle via gateway systems of the respective vehicles. For example, an edge system in a vehicle may transmit data to one or more edge systems in other vehicles via the gateway systems of the respective vehicles communicating over the communication path discussed above.

Each edge system and gateway system may comprise state machines, such as processor(s) coupled to memory. Both the edge systems and the gateway systems may be configured with a common operating system to support portable, system-wide edge software implementations. In other words, each of the edge systems and the gateway systems may be equipped with standard software to facilitate inter-operability among the edge systems and the gateway systems. In the discussion below, such software will be referred to as edge software. The edge software may enable each edge system or gateway system to perform various functions listed below (non-exhaustive) to enable data analysis and data exchange among the various systems illustrated in FIG. 1A (e.g., edge systems, gateway systems, operations centers, remote systems):

Filter and analyze real-time and stored data collected from other edge systems, vehicle systems, gateway systems, and/or operations center(s), and generate events based on the analysis;

Identify dynamic (i.e., as needed) and static (i.e., all the time) data transmission targets (e.g., edge systems within the same vehicle, edge systems in other vehicles, operations center(s));

Transmit data over an Internet connection to the operations centers;

Transmit data and events to other edge and gateway systems within an aircraft that are connected over wired/wireless networks, or to other edge and gateway systems external to the aircraft that are connected over the Internet;

Provide a request/response interface for other edge/gateway systems, vehicle borne computer systems, operations centers, and remote systems connected over wired/wireless networks or Internet to query the stored data and to dynamically select/change data filters;

Use request/response interfaces provided by other edge systems, gateway systems, and operations centers connected over wired/wireless networks or Internet to obtain data and to dynamically select/change data filters;

Receive events from other edge systems, gateway systems, and operations centers; and Specify and communicate generic purposes (i.e., types of data the edge/gateway system is interested in) to other edge systems, gateway systems, and operations centers.

Each edge system or gateway system may autonomously select and deliver data to one or more transmission targets, which may be other edge systems in the same vehicle, edge systems in other vehicles, gateway system in the same vehicle, gateway systems in other vehicles, or operations center(s). Each of the receiving edge or gateway systems (i.e., transmission targets) may be configured to filter the received data using a pre-defined filter, overriding the autonomous determination made by the edge system transmitting the data. In some embodiment, each receiving edge or gateway system may notify the other systems, in advance of the data transmission, of the types of data and/or analysis the receiving system wants to receive (i.e., generic "purposes"). Also, each edge or gateway system may maintain a list including static data transmission targets (transmission targets that always need the data) and dynamic data transmission targets (transmission targets that need the data on as-needed basis).

A gateway system of a vehicle may also be in communication with operations center(s) 105, which may be located remotely from the vehicle (i.e., off-board). In some embodiments, however, the operations center(s) 105 may be located on-board the vehicle. An edge system or a gateway system of a vehicle may transmit data to and obtain data from the operations center(s) 105. Although only one operations center 105 is illustrated in FIG. 1A, it should be noted that multiple operations centers may be in communication with gateway systems of vehicles. Each of the operations center(s) 105 may be implemented in a dedicated location, such as a server system, or may be implemented in a decentralized manner, for example, as part of a cloud system. The communication path between the gateway systems and the operations center(s) may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed. Operations center(s) 105 may be configured to perform various functions listed below (non-exhaustive):

Provide storage of data transmitted from edge systems and gateway systems;

Perform data analytics on the received and/or stored data;

Transmit events to edge systems and gateway systems when data patterns with actionable insights are detected;

Provide a request/response interface for edge/gateway systems, vehicle borne computer systems, and remote systems to obtain data received and stored by the operations center; and Host small to large applications and services.

Operations center(s) 105 may be configured to request, receive, transmit, and process data. In particular, operations center(s) 105 may be configured to generate data requests and transmit the generated data requests to edge/gateway systems, receive data from the edge/gateway systems in response to the transmitted data requests, process data requests from the edge/gateway/remote systems and transmit data in response to the data requests (via request/response interface provided by the operations center(s) 105), and analyze data collected from the edge/gateway systems and generate events based on the analyzed data. The data received by the operations center(s) 105 from the gateway systems may comprise data collected and transmitted by edge systems that are in communication with the gateway systems. For example, the operations center(s) 105 may receive data indicating a failure of a vehicle system or component(s) thereof from a gateway system of the affected vehicle, analyze the data to find patterns or trends representative of a failure, and if such patterns or trends are found, send notifications (e.g., events) to other vehicles (e.g., to edge or gateway system(s) of the other vehicles), requesting testing, repair, and/or replacement of corresponding vehicle system or component(s) thereof in the other vehicles. Also, the operations center(s) 105 may send a notification to a maintenance depot (e.g., remote system 107), requesting maintenance service of the failed vehicle system or component thereof in the affected vehicle, and also requesting maintenance service of the corresponding vehicle system or component(s) thereof in the other vehicles. The generated events (e.g., vehicle system failure, change in travel plan, change in speed, low in fuel, nearby aircraft's deviation from reported flight plan, etc.) may be provided to gateway systems and/or edge systems of vehicles via subscription. Therefore, the gateway systems and/or edge systems may be configured to subscribe to certain types of events generated by the operations center(s) 105. The gateway systems and/or edge systems may further request certain types of events to be delivered when data patterns with actionable insights are detected by the operations center(s) 105. That is, only after certain data patterns or trends are detected by the operations center(s) 105 in the analyzed data, the subscribed events may be transmitted to the gateway systems and/or edge systems that made the request. In some embodiments, the generated events may also be provided to remote system(s) 107 and vehicle borne computer systems via subscription.

Each edge system or gateway system may be configured to inform operations center(s) 105 of the type of data that the edge system or gateway system provides. The operations center(s) 105 may thus maintain a list (e.g., database) of available edge systems and/or gateway systems, each associated with a vehicle identifier of the vehicle in which the corresponding edge/gateway system is implemented, and the type of data that each edge/gateway system provides. Operations center(s) 105 may thus request data from the edge systems and/or the gateway systems based on the list. The data request may be made periodically or dynamically (i.e., as needed). In response, the edge systems and/or the gateway systems may transmit the requested data to the operations center(s) 105 periodically or dynamically. In some embodiments, the edge systems and the gateway systems may transmit data to the operations center(s) 105 voluntarily, without receiving data requests from the operations center(s) 105. The voluntary data transmission may be made statically (i.e., all the time) or periodically.

The operations center(s) 105 may be configured to identify edge systems and/or gateway systems, in one or more vehicles, that may be interested in certain types of data or analysis, and notify the identified edge systems and/or gateway systems of the types of data or analysis that they may be interested in. In response to the notification from the operations center(s) 105, in one embodiment, each of the identified edge systems and/or gateway systems (in one or more vehicles) may communicate to the operations center(s) 105 that it does not want to receive such data and/or analysis, or that it wants to receive some or all of such data and/or analysis. The edge systems and/or gateway systems may also specify how often such data and/or analysis needs to be delivered (e.g., once, periodically, upon detecting a certain event, etc.). In the event that one or more of the edge systems and/or gateway systems communicate that it wants to receive some or all of such data and/or analysis, the operations center(s) 105 either provides such data and/or analysis to the requesting edge and/or gateway system(s), or communicates to the edge and/or gateway system(s) generating/retaining such information (e.g., source edge and/or gateway system(s)) to provide such data and/or analysis to the requesting edge and/or gateway systems. In some embodiments, the list maintained by the operations center(s) 105 may be shared with one or more edge systems and/or gateway systems (in one or more vehicles) so that each of the one or more edge systems and/or gateway systems receiving the list may request data and/or analysis directly from other edge systems and/or gateway systems based on the list. In some embodiments, operations center(s) 105 may notify one or more edge systems and/or gateway systems (in one or more vehicles) of the data and/or analysis that the operations center(s) 105 can provide. The notified edge systems and/or gateway systems may maintain a list (e.g., database) of available operations center(s) 105 and the types of data and/or analysis that each available operations center 105 provides. The edge systems and/or gateway systems maintaining the list may use the list to request certain data and/or analysis from the corresponding available operations center(s).

As illustrated in FIG. 1A, remote system(s) 107 may be communicatively coupled to the operations center(s) 105. Although only one remote system 107 is illustrated in FIG. 1A, it should be noted that multiple remote systems may be in communication with the operations center(s) 105. The remote system(s) 107 may be, for example, fixed computer systems (e.g., desktop computers, etc.) and/or portable computer systems (e.g., mobile phones, tablet PCs, laptop computers, etc.). Using the remote system(s) 107, a user may view data generated or stored by the operations center(s) 105, and/or by the edge systems and/or gateway systems. In particular, the remote system(s) 107 may be in communication with the operations center(s) 105 wirelessly or through a wired connection, and may be configured to request data, receive data, and set filters (i.e., to selectively filter incoming data) via a request/response interface provided by the operations center(s) and/or the edge systems. The remote system(s) 107 may be equipped with data analytics software to perform data analytics on the received data and may be configured to display the received data and/or the results of the data analysis via a graphical user interface (e.g., display data using a web browser, dedicated application, etc.). The remote system(s) 107 may also be configured to subscribe to events generated by the operations center(s). In some embodiments, the remote system 107 may be implemented off-board (i.e., not located in the vehicles). In some embodiments, the remote system(s) 107 may be a ground-based system.

The operations taking place among the various systems illustrated in FIG. 1A will now be described in the context of an aircraft as an exemplary embodiment. Requests for data to be provided to one or more edge systems and/or gateway systems may be initiated by a crew member of an aircraft, or by the edge systems and/or gateway systems themselves. For example, a pilot of an aircraft may request assistance in preparing a flight path of a flight plan, using a vehicle borne computer system or using an edge system coupled to a flight management system. To that end, the pilot may request certain flight-related information to be provided from any one or more of the systems illustrated in FIG. 1A (i.e., from system(s) in the same vehicle, from system(s) in other vehicles, or from operations center(s)). In another embodiment, an edge system or a gateway system may be configured to automatically request (i.e., without human intervention) certain flight-related information from any one or more of the systems illustrated in FIG. 1A.

An edge system or gateway system coupled to a flight management system may then communicate with an operations center of the U.S. Federal Aviation Authority (FAA) to connect to the FAA's System Wide Information Management (SWIM) system and also communicate with an operations center of the U.S. National Weather Services (NWS) system. SWIM system may comprise a database of flight data for numerous aircrafts, weather information, airport operational status, special use airspace status, etc. (e.g., data provided by National Aviation Services), and may provide users/systems/machines (e.g., edge systems, gateway systems, and users via vehicle borne computer systems and/or remote systems) access to the database via publication and subscription. In other words, the users/systems/machines may provide data to the SWIM system (i.e., publication) and also request/receive certain types of data from the SWIM system (i.e., subscription). For example, the SWIM system may receive and retain flight plans of aircrafts that have recently travelled along the same general flight path of the aircraft, and also flight plans of aircrafts that will fly through the same general flight path of the aircraft. NWS system may comprise a database of weather forecast data, warnings of hazardous weather, terminal aerodrome forecast data, Airmen's Meteorological Information (AIRMET), Significant Meteorological Information (SIGMET), etc. The NWS may also provide users/systems/machines access to its database via publication and subscription. For example, the NWS system may provide, to the users/systems/machines, information related to weather requiring deviations in time and location from the current flight path, such as due to inclement weather.

In the current case of a pilot requesting assistance in preparing a flight plan, the SWIM and/or NWS system may provide to the edge system coupled to the flight management system, based on analyzing the retained data, flight paths that can be replicated by the aircraft, data relating to intersecting flights which have deviated from their original flight paths, and/or data relating to weather conditions requiring deviations in time/location from the current flight path of the aircraft. Based on the received data, the edge system coupled to the flight management system may further process or analyze the received data to generate a suggested flight plan and provide the suggested flight plan to the flight management system.

In some embodiments, the edge systems and/or gateway systems of the aircraft may obtain real-time data (e.g., real-time flight data of other aircrafts) from edge systems and/or gateway systems of other aircrafts that are on similar flight paths in order to, for example, determine whether any of the other aircrafts has deviated from its intended flight plan. Data such as latitude, longitude, and altitude, collected by an edge system or a gateway system coupled to a navigation system of one of the other aircrafts, may be provided to the requesting edge system or gateway system in the aircraft in order to determine whether the one of the other aircrafts has deviated from its intended flight plan. The requesting edge system or gateway system in the aircraft may receive the data, and further process or analyze the data to generate a suggested flight plan. The generated flight plan including a flight path may be provided to the flight management system coupled to the requesting edge system or gateway system.

Figure 2:
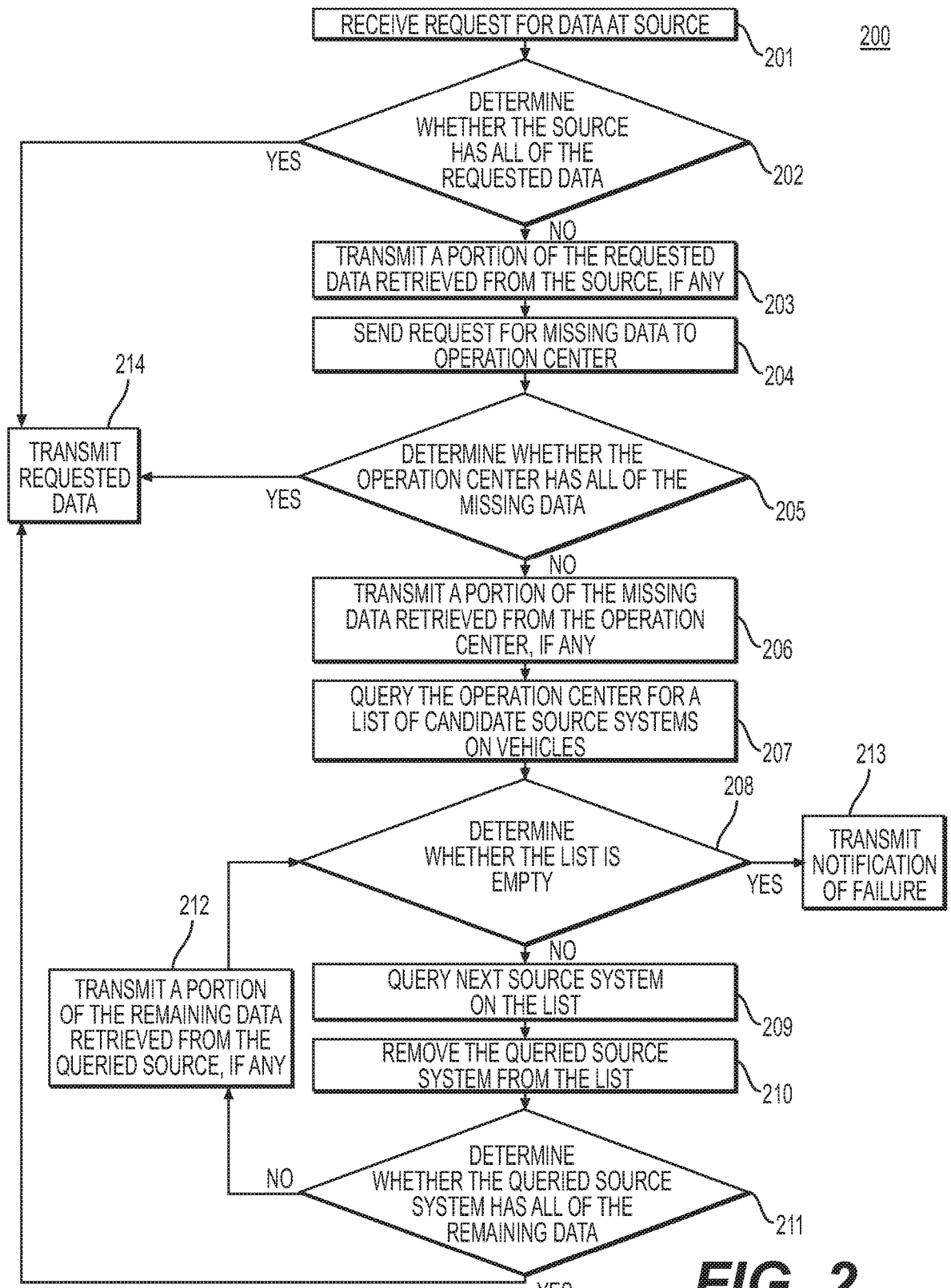
FIG. 2 is a flowchart illustrating an exemplary method of communicating real-time data among systems implemented in one or more vehicles.

FIG. 2 is a flowchart illustrating an exemplary method 200 of communicating real-time data among systems implemented in one or more vehicles. The blocks of the flowchart have been arranged in a generally sequential manner for ease of explanation. However, it is to be understood that this arrangement is merely exemplary, and it should be recognized that the process steps associated with the exemplary method (i.e., the blocks shown in FIG. 2) can occur in a different order (for example, where at least some of the process steps may be performed in parallel and/or in an event-driven manner).

In step 201, a source system may receive a request for data from a requestor system. Here, the source system may be an edge system or a gateway system in a vehicle, and the requestor system may be another edge system or gateway system in the same or a different vehicle.

In step 202, the source system may determine whether the source system has all of the requested data by querying the data store (e.g., memory) of the source system. If the source system determines that the source system has all of the requested data, the method proceeds to step 214 where all of the requested data may be transmitted to the requestor system.

If the source system determines that the source system does not have all of the requested data, the method proceeds to step 203 where a portion of the requested data retrieved from the source system, if any, may be transmitted to the requestor system. Then, in step 204, upon being notified that the source system does not have all of the requested data, the requestor system may send a request for the missing data to operations center. In some embodiments, the request for the missing data may be sent directly from the source system to the operations center. As alluded to above, the operations centers may retain data published by the edge and/or gateway systems. In step 205, the operations center may determine whether the operations center have all of the missing data by querying the data store (e.g. memory) of the operations center. If the operations center determines that the operations center has all of the missing data, the method proceeds to step 214 where all of the missing data may be transmitted to the requestor system.

If the operations center determines that the operations center does not have all of the missing data, the method proceeds to step 206 where a portion of the missing data retrieved from the operations center, if any, may be transmitted to the requestor system. Then, in step 207, the operations center may query the data store (e.g., memory) of the operations center for a list of candidate source systems (e.g., edge and/or gateway systems) on vehicles that may have the remaining data, then retrieve the list from the data store. In step 208, the operations center may determine whether the retrieved list is empty. If the operations center determines that the retrieved list is empty, the method proceeds to step 213 where the operations center may transmit a notification of failure to obtain all of the requested data to the requestor system.

If the operations center determines that the retrieved list is not empty, the method proceeds to step 209, where a data request for the remaining data may be transmitted to a next source system on the list, to query the data store (e.g., memory) of the next source system for the remaining data. The data request for the remaining data may be transmitted from the operations center to the next source system. In some embodiments, the retrieved non-empty list may be transmitted to the requestor system, and the data request for the remaining data may be made by the requestor system to the next source system. In step 210, upon querying the data store of the next source system for the remaining data, the queried source system may be removed from the list by the operations center (and also by the requestor system, if the list is being retained at the requestor system).

In step 211, the queried source system may determine whether the queried source system has all of the requested remaining data. If the queried source system determines that the queried source system has all of the requested remaining data, the method proceeds to step 214, where all of the requested remaining data may be transmitted from the queried source system to the requestor system. If the queried source system determines that the queried source system does not have all of the requested remaining data, the method proceeds to step 212, where a portion of the requested remaining data retrieved from the queried source system, if any, may be transmitted to the requestor system. Then, the method loops back to step 208 and the operations center (or the requestor, if the list is being retained at the requestor system) may check the list for a next source system to query for any remaining data. Steps 208-210 may be iteratively performed until either 1) all of the remaining data are retrieved from the listed systems, where the method then proceeds to step 214, or 2) the list is empty, where the method then proceeds to step 213.

Figure 3:
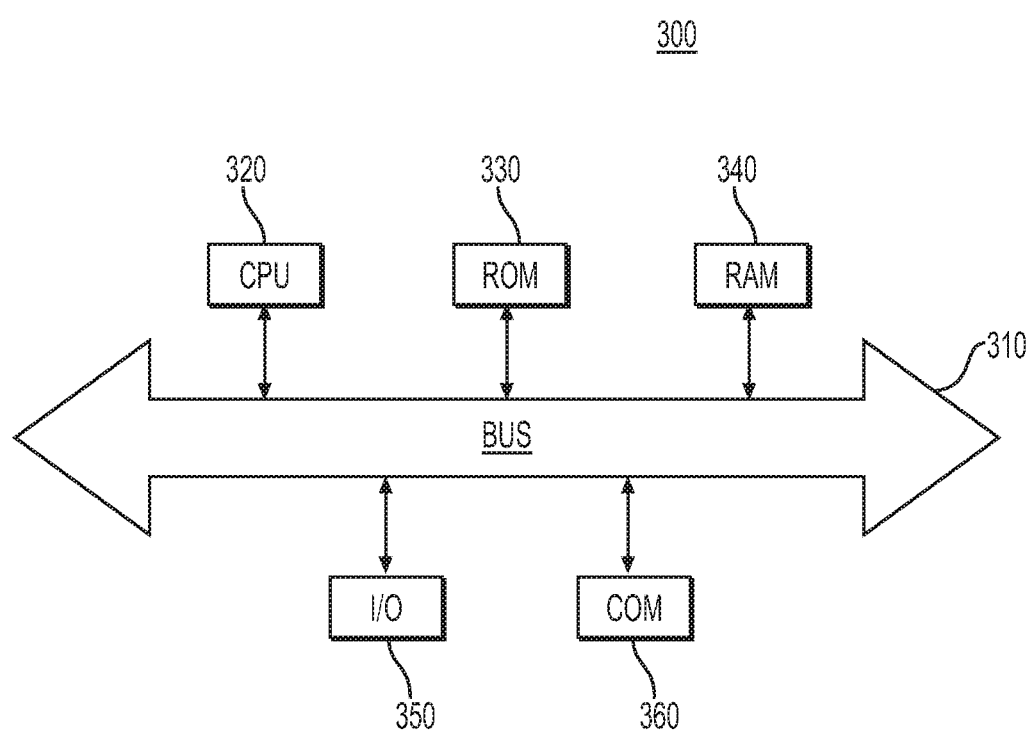
FIG. 3 illustrates an exemplary device in which one or more embodiments may be implemented.

Various embodiments of the present disclosure (e.g., edge systems, gateway systems, operations centers, remote systems, etc.), as described above with reference to FIG. 1A, FIG. 1B, and FIG. 2 may be implemented using device 300 in FIG. 3. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 3, device 300 may include a central processing unit (CPU) 320. CPU 320 may be any type of processor device including, for example, any type of special purpose or a general purpose microprocessor device. As will be appreciated by persons skilled in the relevant art, CPU 320 also may be a single processor in a multi-core/multi-processor system, such system operating alone, or in a cluster of computing devices operating in a cluster or server farm. CPU 320 may be connected to a data communication infrastructure 310, for example, a bus, message queue, network, or multi-core message-passing scheme.

Device 300 may also include a main memory 340, for example, random access memory (RAM), and may also include a secondary memory 330. Secondary memory 330, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 330 may include other similar means for allowing computer programs or other instructions to be loaded into device 300. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 300.

Device 300 may also include a communications interface ("COM") 360. Communications interface 360 allows software and data to be transferred between device 300 and external devices. Communications interface 360 may include a modem, a network interface (such as an Ethernet card), a communications port, a PCMCIA slot and card, or the like. Software and data transferred via communications interface 360 may be in the form of signals, which may be electronic, electromagnetic, optical, or other signals capable of being received by communications interface 360. These signals may be provided to communications interface 360 via a communications path of device 300, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 300 also may include input and output ports 350 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of exchanging real-time data between vehicle systems, comprising:
    transmitting, by a requestor device, a request for sensor data to a first vehicle system;
    based on determining that the first vehicle system does not have the requested sensor data, transmitting a request to an operations center for the requested sensor data;
    based on determining that the operations center does not have the requested sensor data, querying the operations center for a list of second vehicle systems;
    querying one or more of the second vehicle systems for the requested sensor data; and
    receiving, at the requestor device, the requested sensor data from the one or more of the second vehicle systems.

2. The computer-implemented method of claim 1, wherein the requestor device, the first vehicle system, and the one or more of the second vehicle systems are edge systems in a vehicle.

3. The computer-implemented method of claim 1, wherein the requestor device, the first vehicle system, and the one or more of the second vehicle systems are edge systems in multiple vehicles.

4. The computer-implemented method of claim 1, wherein the requested sensor data is transmitted through a communication network connecting multiple vehicles.

5. The computer implemented method of claim 4, wherein the communication network connects multiple vehicles via gateway systems of the multiple vehicles.

6. The computer-implemented method of claim 1, further comprising transmitting a notification of failure to the requestor device based on determining that the list of second vehicle systems is empty.

7. The computer-implemented method of claim 1, wherein the list of second vehicle systems associates each second vehicle system with one or more types of data that the each second vehicle system provides.

8. The computer-implemented method of claim 1, wherein the operations center is implemented on a cloud computing system.

9. The computer-implemented method of claim 8, wherein the requestor device, the first vehicle system, and the one or more of the second vehicle systems are edge systems configured to publish data to the operations center and/or subscribe to data at the operations center.

10. The computer-implemented method of claim 1, wherein the requestor device, the first vehicle system, and the one or more of the second vehicle systems are edge systems coupled to one or more third vehicle systems of a vehicle or multiple vehicles.

11. A system for exchanging real-time data between vehicle systems, comprising:
    one or more processors; and
    a non-transitory computer readable medium storing instructions that, when executed by the one or more processors, cause the one or more processors to perform:
    transmitting, by a requestor device, a request for sensor data to a first vehicle system;
    based on determining that the first vehicle system does not have the requested sensor data, querying an operations center for the requested sensor data;
    based on determining that the operations center does not have the requested sensor data, querying the operations center for a list of second vehicle systems;
    querying one or more of the second vehicle systems for the requested sensor data; and
    receiving, at the requestor device, the requested sensor data from the one or more of the second vehicle systems.

12. The system of claim 11, wherein the requestor device, the first vehicle system, and the one or more of the second vehicle systems are edge systems in multiple vehicles.

13. The system of claim 11, wherein the requested sensor data is transmitted through a communication network connecting multiple vehicles.

14. The system of claim 13, wherein the communication network connects multiple vehicles via gateway systems of the multiple vehicles.

15. The system of claim 11, wherein the instructions further cause the one or more processors to perform transmitting a notification of failure to the requestor device based on determining that the list of second vehicle systems is empty.

16. A non-transitory computer readable medium storing instructions that, when executed by one or more processors, cause the one or more processors to perform a method of exchanging real-time data between vehicle systems comprising:

transmitting, by a requestor device, a request for sensor data to a first vehicle system;
based on determining that the first vehicle system does not have the requested sensor data, querying an operations center for the requested sensor data;
based on determining that the operations center does not have the requested sensor data, querying the operations center for a list of second vehicle systems;
querying one or more of the second vehicle systems for the requested sensor data; and
receiving, at the requestor device, the requested sensor data from the one or more of the second vehicle systems.

17. The non-transitory computer readable medium of claim 16, wherein the instructions further cause the one or more processors to perform transmitting a notification of failure to the requestor device based on determining that the list of second vehicle systems is empty.

18. The non-transitory computer readable medium of claim 16, wherein the list of second vehicle systems associates each second vehicle system with one or more types of data that the each second vehicle system provides.

19. The non-transitory computer readable medium of claim 16, wherein the operations center is implemented on a cloud computing system.

20. The non-transitory computer readable medium of claim 19, wherein the requestor device, the first vehicle system, and the one or more of the second vehicle systems are edge systems configured to publish data to the operations center and/or subscribe to data at the operations center.

* * * * *